US012563098B2

(12) United States Patent
Behera et al.

(10) Patent No.: US 12,563,098 B2
(45) Date of Patent: Feb. 24, 2026

(54) SYSTEM AND METHOD FOR PERFORMING A SECURED OPERATION

(71) Applicant: Bank of America Corporation, Charlotte, NC (US)

(72) Inventors: Abhijit Behera, Telangana (IN); Gowri Sundar Suriyanarayanan, Tamilnadu (IN); Maneesh Kumar Sethia, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 18/482,356

(22) Filed: Oct. 6, 2023

(65) Prior Publication Data
US 2025/0119455 A1 Apr. 10, 2025

(51) Int. Cl.
*H04L 9/40* (2022.01)
(52) U.S. Cl.
CPC .......... *H04L 63/20* (2013.01); *H04L 63/0869* (2013.01)
(58) Field of Classification Search
CPC ............................ H04L 63/20; H04L 63/0869
See application file for complete search history.

(56) References Cited

U.S. PATENT DOCUMENTS

| | | | |
|---|---|---|---|
| 7,437,023 | B2 | 10/2008 | King et al. |
| 8,051,180 | B2 | 11/2011 | Mazzaferri et al. |
| 8,316,237 | B1 | 11/2012 | Felsher et al. |
| 8,468,244 | B2 | 6/2013 | Redlich et al. |
| 8,855,469 | B2 | 10/2014 | Maharajih et al. |
| 8,898,286 | B2 | 11/2014 | Garrett et al. |
| 9,210,081 | B2 | 12/2015 | Chadda et al. |
| 9,235,833 | B2 | 1/2016 | Bradley et al. |
| 9,270,492 | B2 | 2/2016 | Ansari et al. |
| 9,491,564 | B1 | 11/2016 | Raleigh |
| 9,496,237 | B2 | 11/2016 | Beer et al. |
| 10,360,561 | B2 | 7/2019 | Poon et al. |
| 10,484,336 | B2 | 11/2019 | Kumar et al. |
| 11,468,438 | B2 | 10/2022 | Dua |
| 2008/0120240 | A1 | 5/2008 | Ginter et al. |
| 2013/0067526 | A1 | 3/2013 | Reisman |
| 2017/0337387 | A1* | 11/2017 | Scafaria ............... G06F 21/6245 |
| 2018/0284745 | A1 | 10/2018 | Cella et al. |
| 2019/0036911 | A1 | 1/2019 | Bell et al. |
| 2020/0342449 | A1 | 10/2020 | Lai et al. |
| 2021/0194700 | A1 | 6/2021 | Moy et al. |
| 2021/0320947 | A1* | 10/2021 | Moridi ................... H04L 9/0894 |

FOREIGN PATENT DOCUMENTS

| | | | | |
|---|---|---|---|---|
| EP | | 3026617 A1 * | 6/2016 | ............. G06Q 10/10 |

* cited by examiner

*Primary Examiner* — Noura Zoubair

(57) ABSTRACT

A system for performing secured operations includes a user device and a server. The user device generates a first operation data that includes the origin of the operation and a unique identifier of a user. The user device communicates the operation data to the server. The server generates, based on the first operation data, one or more first conditional rules that include a first rule that indicates the operation is to be executed when a second user requesting to receive a data item is identified. The server determines that one or more first conditional rules are met. In response, the server communicates a signal to the user device, where the signal indicates to transfer the data item to a second user device associated with the second user.

18 Claims, 3 Drawing Sheets

300 ⟋

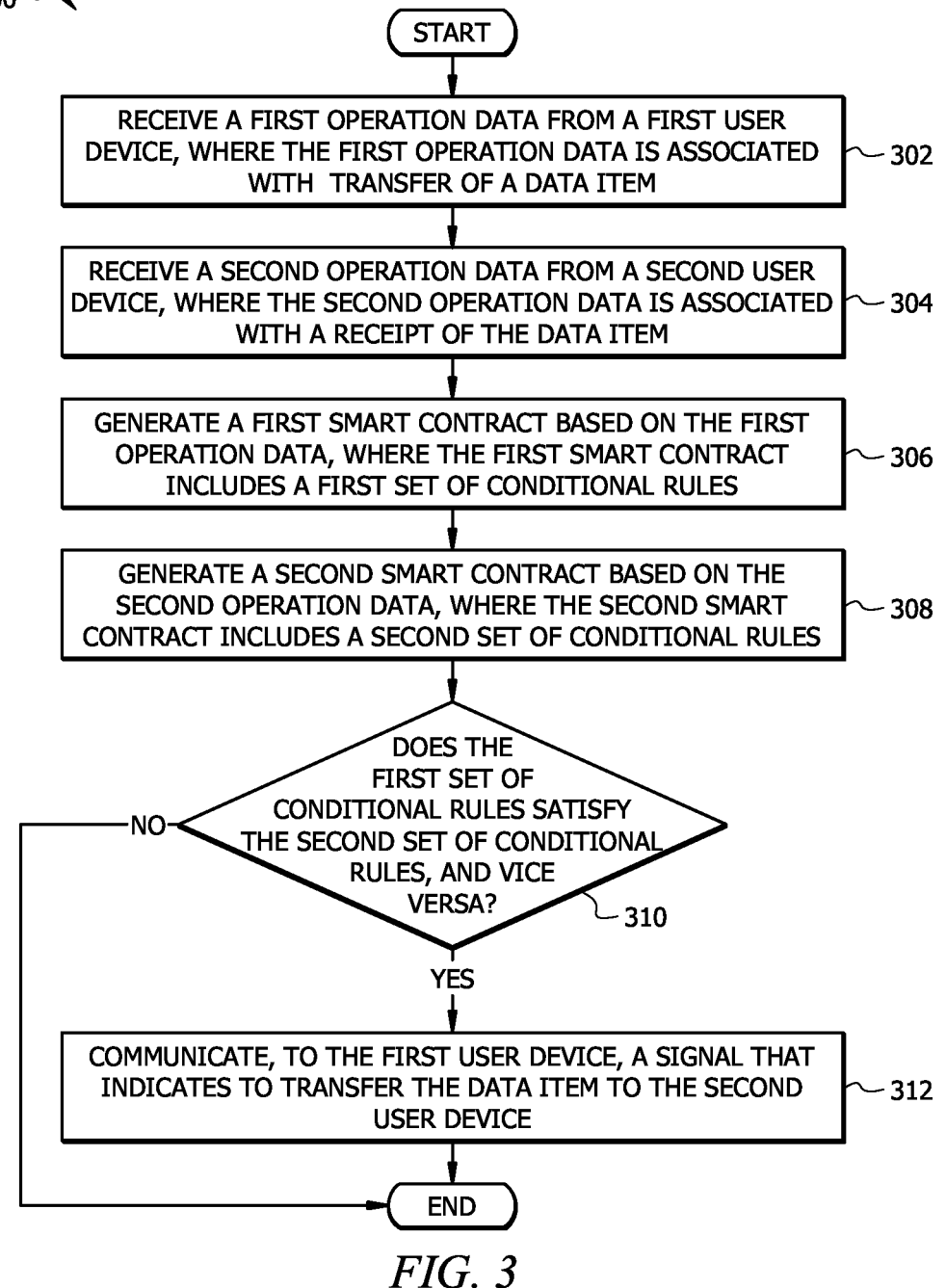

START

RECEIVE A FIRST OPERATION DATA FROM A FIRST USER DEVICE, WHERE THE FIRST OPERATION DATA IS ASSOCIATED WITH TRANSFER OF A DATA ITEM ~302

RECEIVE A SECOND OPERATION DATA FROM A SECOND USER DEVICE, WHERE THE SECOND OPERATION DATA IS ASSOCIATED WITH A RECEIPT OF THE DATA ITEM ~304

GENERATE A FIRST SMART CONTRACT BASED ON THE FIRST OPERATION DATA, WHERE THE FIRST SMART CONTRACT INCLUDES A FIRST SET OF CONDITIONAL RULES ~306

GENERATE A SECOND SMART CONTRACT BASED ON THE SECOND OPERATION DATA, WHERE THE SECOND SMART CONTRACT INCLUDES A SECOND SET OF CONDITIONAL RULES ~308

DOES THE FIRST SET OF CONDITIONAL RULES SATISFY THE SECOND SET OF CONDITIONAL RULES, AND VICE VERSA? ~310

NO

YES

COMMUNICATE, TO THE FIRST USER DEVICE, A SIGNAL THAT INDICATES TO TRANSFER THE DATA ITEM TO THE SECOND USER DEVICE ~312

END

*FIG. 3*

SYSTEM AND METHOD FOR PERFORMING A SECURED OPERATION

TECHNICAL FIELD

The present disclosure relates generally to information security, and more specifically to a system and method for performing a secured operation.

BACKGROUND

People use devices to communicate different kinds of data to other people. For example, when a user wants to transmit a data item, the user may share the data item on a website where other users can access the data item. In such cases, a bad actor may trace the data item back to the sending device and hence the user profile of the user. This may allow the bad actor to able to access all the data items stored in the user profile and exfiltrate the data items.

SUMMARY

The disclosed system described in the present disclosure is particularly integrated into a practical application of increasing security in performing operations, including the transferring of data items through a network. In current approaches, when a user wants to transfer a data item, the user may share the data item with a website where other users can access data items. If a bad actor accesses the website, the bad actor may be able to trace the data item back to the user profile where the data item originated based on an identification of the user profile that is accompanied by the data item. In current approaches, the user profile can be traced from the website based on the identification of the user profile that is associated with the data item shared with the website.

Therefore, current approaches lack providing security for user profiles and lack safety in facilitating the transferring of data items via the network. Thus, if a bad actor traces the data item back to the user profile, the bad actor is able to access all the data items stored in the user profile and exfiltrate the data items.

The disclosed system is configured to provide a technical solution to this and other technical problems of the data transfer and communication technology. For example, the disclosed system is configured to decouple the website (and the server associated with the website) from the user profiles (and by extension from the user devices). To this end, the disclosed system is configured to implement a local cache locker to store the data item that is desired to be transferred. The local cache locker may be a portion of a memory that is outside of the user profile and may be locked when the data item is stored in it. Therefore, the user profile cannot be accessed even if the data item is traced back to the local cache locker. Therefore, the disclosed system provides the practical application of increasing the security of user profiles and user devices.

The disclosed system is further configured to provide an additional practical application of implementing secured operations, such as the transferring of data items by implementing a validation technique to validate the legitimacy of the first user who attempts to transmit the data item and the legitimacy of the second user who attempts to receive the data item. For example, to this end, the disclosed system is configured to generate data in a first operation for the operation of transmitting the data item and a second operation data for a request of the second user. The first operation data may include or indicate proof-of-origin information about the data item, the first user device, and/or first the user. Therefore, the first operation data is used to validate the authenticity of the request of the first user to transfer the data item. The second operation data may include or indicate proof-of-origin information about the second user, the second user device, and/or the request of the second user to receive the data item. Thus, the second operation data is used to validate the authenticity of the request of the second user to receive the data item. In this manner, the disclosed system increases the security measures for the transferring of data items via the network-providing a more secure transferring of data items via the network. Accordingly, the disclosed system provides practical applications and technical improvements to information security technology and data transfer and communication technology by adding security measures for validating the origin of the transfer request and the origin of the receipt request. Therefore, the security of the devices involved in transmitting and receiving the data items is increased, and secured access to the devices is provided.

In some embodiments, a system for performing secured operations comprises a first user device and a server. The first user device includes a first memory operably coupled to a first processor. The first memory is configured to store an operation, wherein the operation comprises transferring a data item from a first user profile associated with a first user. The first processor is configured to receive user input indicating the data item. The first processor is further configured to generate a first operation data associated with the operation. The first operation data comprises one or more of an origin of the operation, the data item, or a unique identifier identifying the first user. The first operation data is generated based at least in part upon the user input. The first processor is further configured to communicate the first operation data. The server is operably coupled to the first user device. The server comprises a second processor. The second processor is configured to receive the first operation data from the first user device. The second processor is further configured to generate, based at least in part upon the first operation data, one or more conditional rules that comprise a first rule that indicates that the operation is to be executed when a second user requesting to receive the data item is identified. The second processor is further configured to determine that the one or more conditional rules are met. In response to determining that the one or more conditional rules are met, the second processor is further configured to communicate a signal to the first user device, where the signal indicates to transfer of the data item to a second user profile associated with the second user. The first processor is further configured to transfer the data item to the second user profile in response to receiving the signal.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates an example flowchart of a method to perform secured operations.

DETAILED DESCRIPTION

Figure 1:
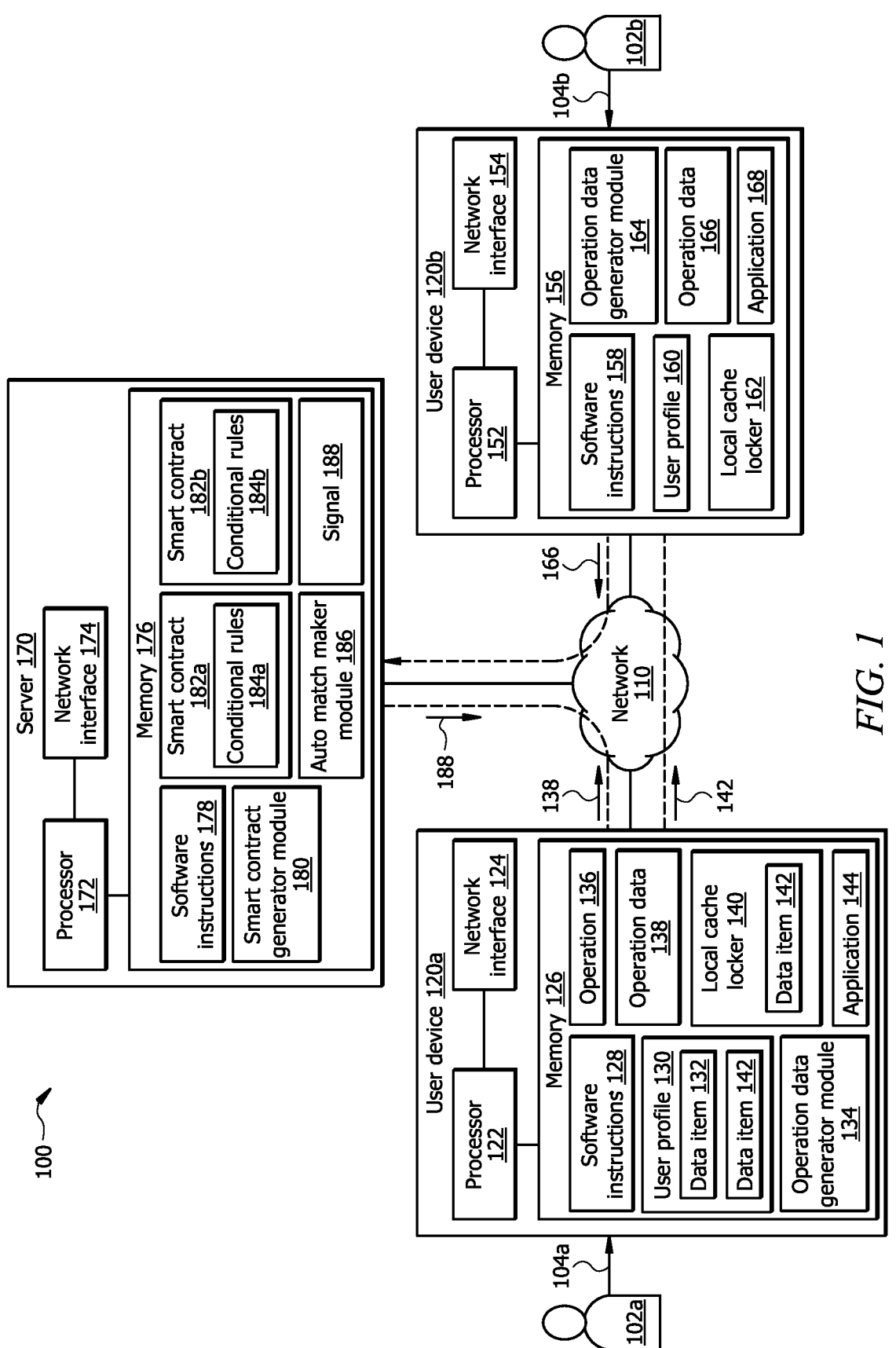
FIG. 1 illustrates an embodiment of a system configured to perform secured operations.
Figure 2:
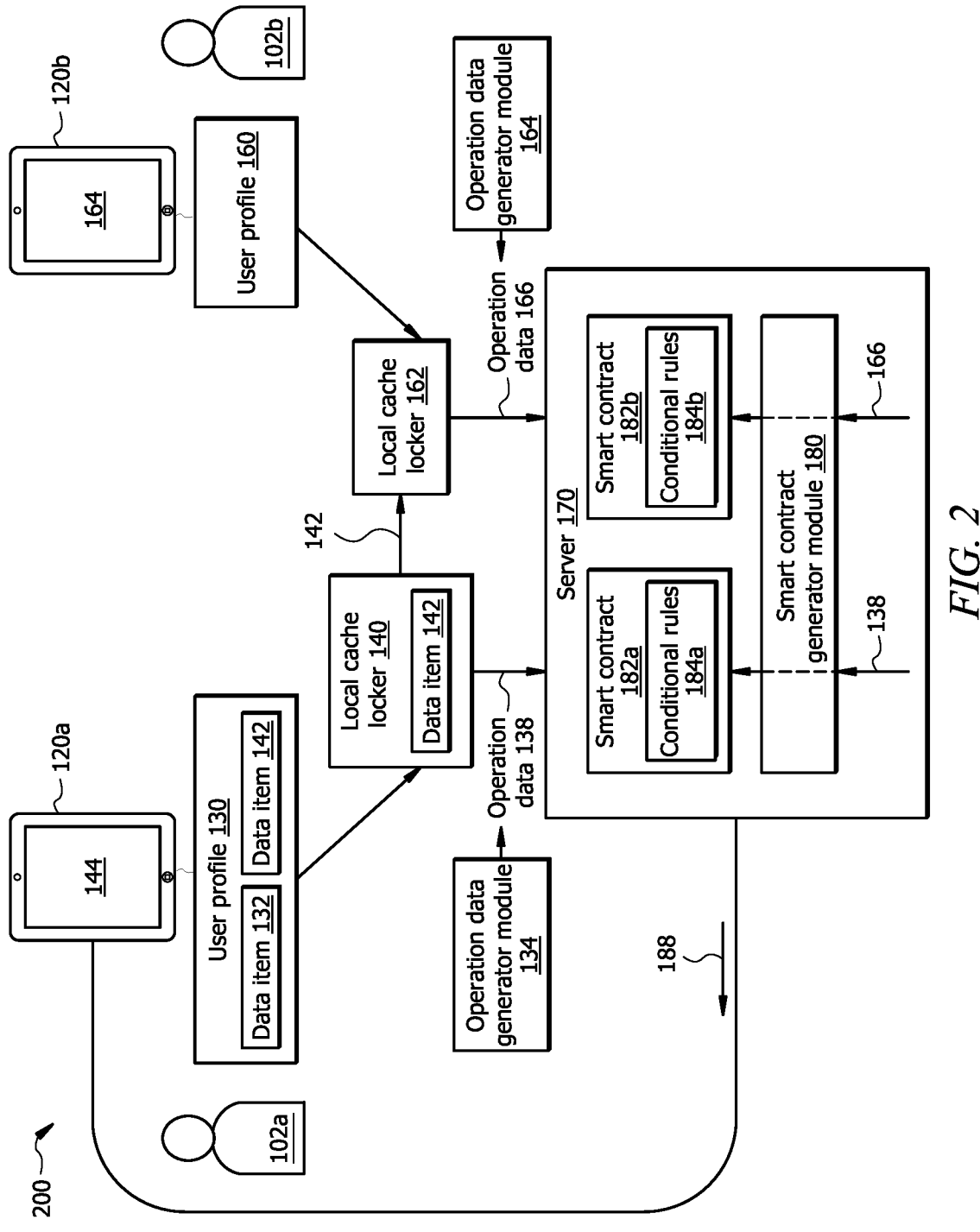
FIG. 2 illustrates an example operational flow of the system of FIG. 1.

As described above, previous technologies fail to provide efficient and reliable solutions to perform secured operations, such as transmitting data items via a network. Embodiments of the present disclosure and its advantages may be understood by referring to FIGS. 1 through 3. FIGS. 1 through 3 are used to describe systems and methods to perform secured operations, such as transmitting data items via a network, according to some embodiments.

System Overview

FIG. 1 illustrates an embodiment of a system 100 that is generally configured to enhance the safety and efficiency in performing operations 136, such as the transferring of data items 142 from one device to another. In the illustrated embodiment, the system 100 comprises a server 170 communicatively coupled with one or more user devices 120a and 150, via a network 110. Network 110 enables communications between components of the system 100. The user device 120a may be associated with a first user 102a who wants to perform an operation 136, such as transferring of data item 142 via the network 110. The user device 120b may be associated with a second user 102b who wants to receive the data item 142. The server 170 is configured to oversee the transfer of the data item 142 from the user device 120a to user device 120b. In other embodiments, system 100 may not have all of the components listed and/or may have other elements instead of, or in addition to, those listed above.

In general, the system 100 increases the safety and efficiency of performing operations 136, including transferring of data items 132 via the network 110. In current approaches, when a first user 102a wants to transfer data item 142, the first user 102a may share the data item 142 with a website where users can access data items 132. The website may be implemented with and associated with the server 170. In current approaches, if a bad actor accesses the server 170, the bad actor may be able to trace the data item 142 back to the user profile 130 where the data item 142 originated based on an identification of the user profile 130 that is accompanied with the data item 142. In current approaches, the user profile 130 can be traced from the server based on the identification of the user profile 130 that is associated with the data item 142 shared with the server. Therefore, current approaches lack providing security to user profiles 130 and in facilitating transferring of data items 142 via the network. 110. Thus, if a bad actor traces the data item 142 back to the user profile 130, the bad actor is able to access all the data items 132, 142 stored in the user profile 130 and exfiltrate the data items 132, 142.

The system 100 is configured to provide a technical solution to this and other technical problems of the data transfer and communication technology. For example, the system 100 is configured to decouple the server 170 (and the website associated with the server 170) from the user profiles 130, 160 (and by extension from the user devices 120a and 120b). To this end, the system 100 is configured to implement a local cache locker 140 to store the data item 142 that is desired to be transferred. The local cache locker 140 may be a portion of a memory 126 that is outside of the user profile 130 and may be locked when the data item 142 is stored in it. Therefore, the user profile 130 cannot be accessed even if the data item 142 is traced back to the local cache locker 140. Similarly, when the user 102b wants to receive the data item 142, a placeholder for the data item 142 may be placed in the local cache locker 162 that is outside of the user profile 160. The local cache locker 162 may be a portion of the memory 156 that is outside of the user profile 160 and may be locked when the placeholder of the data item 142 is stored in it. Therefore, the user profile 160 cannot be accessed directly from the server 170. Therefore, the system 100 provides the practical application of increasing the security of user profiles 130, 160 and user devices 120a-b.

The system 100 is further configured to provide an additional practical application of implementing secured operations 136, such as the transferring of data items 142 by implementing a validation technique to validate the legitimacy of the user 102a who attempts to transfer the data item 142 and the legitimacy of the user 102b who attempts to receive the data item 142. For example, to this end, the system 100 is configured to generate operation data 138 for the operation 136 and operation data 166 for a request of the user 102b. The operation data 138 may include or indicate proof-of-origin information about the data item 142, user device 120a, and/or the user 102a. Therefore, the operation data 138 is used to validate the authenticity of the request of the user 102a to transfer the data item 142. The operation data 166 may include or indicate proof-of-origin information about the user 102b, user device 120b, and/or the request of the user 102b to receive the data item 142. Thus, the operation data 166 is used to validate the authenticity of the request of the user 102b to receive the data item 142.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example User Device

Each of the user devices 120a and 120b is an instance of a user device 120. The user device 120 may be generally any device that is configured to process data and interact with users 102a,b. Examples of the user device 120 include but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The user device 120a may include a user interface, such as a display, a microphone, a camera, a keypad, or other appropriate terminal equipment usable by user 102. The user device 120a may include a hardware processor, memory, and/or circuitry configured to perform any of the functions or actions of the user device 120 described herein. For example, the user device 120a includes a processor 122 in signal communication with a network interface 124 and a memory 126. The memory 126 stores software instructions 128 that when executed by the processor 122 cause the processor 122 to perform one or more operations of the user device 120a described herein. The user device 120a is configured to communicate with other devices and components of the system 100 via the network 110. In the present disclosure, the user device 120a may be interchangeably referred to as a computing device.

Processor 122 comprises one or more processors. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 128) to perform the operations of the server 170 described herein. In this way, processor 122 may be a special-purpose computer designed to implement the functions disclosed herein. In an embodiment, the processor 122 is implemented using logic units, FPGAs, ASICS, DSPs, or any other suitable hardware. The processor 122 is configured to operate as described in FIGS. 1-3. For example, the processor 122 may be configured to perform one or more operations of the operational flow 200 as described in FIG. 2 and one or more operations of the method 300 as described in FIG. 3.

Network interface 124 is configured to enable wired and/or wireless communications. The network interface 124 may be configured to communicate data between the user device 120a and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

The memory 126 may be a non-transitory computer-readable medium. The memory 126 may be volatile or non-volatile and may comprise read-only memory (ROM), random-access memory (RAM), ternary content-addressable memory (TCAM), dynamic random-access memory (DRAM), and/or static random-access memory (SRAM). The memory 126 may include one or more of a local database, a cloud database, a network-attached storage (NAS), etc. The memory 126 comprises one or more disks, tape drives, or solid-state drives, and may be used as an over-flow data storage device, to store programs when such programs are selected for execution, and to store instructions and data that are read during program execution. The memory 126 may store any of the information described in FIGS. 1-3 along with any other data, instructions, logic, rules, or code operable to implement the function(s) described herein when executed by processor 122. For example, the memory 126 may store software instructions 128, operation data generator module 134, operation data 138, operation 136, application 144, local cache locker 140, user profile 130, and/or any other data or instructions. The software instructions 128 may comprise any suitable set of instructions, logic, rules, or code operable to execute the processor 122 and perform the functions described herein, such as some or all of those described in FIGS. 1-3.

The operation data generator module 134 may be implemented by the processor 122 executing the software instructions 128 and is generally configured to generate operation data 138. For example, the operation data generator module 134 may be given certain information about the transfer of the data item 142, including which data items 142 are desired to be transferred, the duration of performing operations on the data item(s) 142, timestamp of originating the operation 136 (e.g., the timestamp of receiving the request to transfer the data item 142), among others. For example, the user 102a may provide such information to the operation data generator module 134 by providing user input 104a to the user device 120a, and the operation data 138 may be generated based at least on the user input 104a. In the same or another example, the operation data generator module 134 may access certain information related to the user device 120a, including a unique identifier of the user device 120a, an internet protocol (IP) address of the user device 120a, the location of the user device 120a (detected from a location sensor associated with the user device 120a), among others. In the same or another example, the operation data generator module 134 may access user information, including a unique identifier associated with the user 102a, and a unique identifier associated with the user profile 130, among others.

The operation data generator module 134 may use the received information to generate the operation data 138. For example, the operation data generator module 134 may be implemented by a data structuring, hashing, encoding (e.g., Base64, etc.) algorithm to generate the operation data 138. The operation data generator module 134 may feed the received information to the data structuring, hashing, or encoding algorithm to generate the operation data 138. In other examples, the operation data generator module 134 may be implemented by any suitable method to generate the operation data 138.

The operation data 138 may include or indicate the origin of the operation 136, the timestamp of origination of the operation 136 (e.g., the timestamp of receiving the request to transfer the data item 142), the desired duration of the operation 136, information about the transfer of the data item 142, the duration of performing operations on the data item(s) 142, information related to the user device 120a (e.g., IP address of the user device 120a, the location of the user device 120a), user information (e.g., a unique identifier associated with the user 102a, a unique identifier associated with the user profile 130), among other information.

The application 144 may be a software, web, or mobile application. The application 144 may be associated with the organization to which the server 170 is associated. The application 144 may provide an interface for the user 102a to interact with the application 144 to provide user input 104a to the user device 120a. For example, the application 144 may include interfaces to access each of the user profile 130 and local cache locker 140. When the user the user 102a wants to initiate a request to transfer the data item 142, the user 102a may access the user profile 130 from the application 144 and move the data item 142 from the user profile 130 to the local cache locker 140. In some embodiments, the user device 120a may move the data item 142 from the user profile 130 to the local cache locker 140 in response to the user request. The user profile 130 may be dedicated to store data items 132, and 142, user information, such as name, address, identifier of the user 102a, identifier of the user device 120a, identifier of the user profile 130, etc. In some examples, the user profile 130 may include a digital wallet and/or a user profile associated with the user 102a. In some examples, each of data items 132 and 142 may include files, documents, data objects, items of value (e.g., cryptocurrency), and the like.

The user device 120b includes a processor 152 in signal communication with a network interface 154 and a memory 156. The memory 156 stores software instructions 158 that when executed by the processor 152 cause the processor 152 to perform one or more operations of the user device 120b described herein. The user device 120b is configured to communicate with other devices and components of the system 100 via the network 110. In the present disclosure, the user device 120b may be interchangeably referred to as a computing device.

Processor 152 comprises one or more processors. The processor 152 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture. The processor 152 may include an ALU for performing arithmetic and logic operations. The processor 152 may register the supply operands to the ALU and store the results of ALU operations. The processor 152 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 158) to perform the operations of the server 170 described herein. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-3. For example, the processor 152 may be configured to perform one or more operations of the operational flow 200 as described in FIG. 2 and one or more operations of the method 300 as described in FIG. 3.

Network interface 154 is configured to enable wired and/or wireless communications. The network interface 154 may be configured to communicate data between the user device 120b and other devices, systems, or domains. For example, the network interface 154 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 152 may be configured to send and receive data using the network interface 154. The network interface 154 may be configured to use any suitable type of communication protocol.

The memory 156 may be a non-transitory computer-readable medium. The memory 156 may be volatile or non-volatile and may comprise ROM, RAM, TCAM, DRAM, and/or SRAM. The memory 156 may include one or more of a local database, a cloud database, a NAS, etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-3 along with any other data, instructions, logic, rules, or code operable to implement the function(s) described herein when executed by processor 152. For example, the memory 156 may store software instructions 158, operation data generator module 164, user profiles 160, local cache locker 162, application 168, operation data 166, and/or any other data or instructions. The software instructions 158 may comprise any suitable set of instructions, logic, rules, or code operable to execute the processor 152 and perform the functions described herein, such as some or all of those described in FIGS. 1-3.

The operation data generator module 164 may be implemented by the processor 152 executing the software instructions 158 and is generally configured to generate operation data 166. For example, the operation data generator module 164 may be given certain information about the receipt of the data item 142, including which data items 142 are desired to be received, the duration of performing operations on the data item(s) 142, among others. For example, the user 102b may provide such information to the operation data generator module 164 by providing user input 104b to the user device 120b and the operation data 166 may be generated based at least on the user input 104b. In the same or another example, the operation data generator module 164 may access certain information related to the user device 120b, including a unique identifier of the user device 120b, an IP address of the user device 120b, the location of the user device 120b (detected from a location sensor associated with the user device 120b), among others. In the same or another example, the operation data generator module 164 may access user information, including a unique identifier associated with the user 102b, a unique identifier associated with the user profile 160, among others.

The operation data generator module 164 may use the received information to generate the operation data 166. For example, the operation data generator module 164 may be implemented by a data structuring, hashing, encoding (e.g., Base64, etc.) algorithm to generate the operation data 166. The operation data generator module 164 may feed the received information to the data structuring, hashing, or encoding algorithm to generate the operation data 166. In other examples, the operation data generator module 164 may be implemented by any suitable method to generate the operation data 166.

The operation data 166 may include or indicate the origin of the operation data 166, the timestamp of origination of the operation data 166, the timestamp of receiving the request to receive the data item 142, the requested data item 142, information about the transfer/receipt of the data item 142, the duration of performing operations on the data item(s) 142, information related to the user device 120b (e.g., IP address of the user device 120b, the location of the user device 120b), user information (e.g., a unique identifier associated with the user 102b, a unique identifier associated with the user profile 160), among other information.

The application 168 may be a software, web, or mobile application. The application 168 may be associated with the organization to which the server 170 is associated. The application 168 may provide an interface for the user 102b to interact with the application 168 to provide user input 104b to the user device 120b. For example, the application 168 may include interfaces to access the user profile 160 and local cache locker 162. When the user the user 102b wants to initiate a request to receive the data item 142, the user 102b may access the user profile 160 from the application 168 and indicate the request in the local cache locker 162. In some embodiments, the user device 120b my add a placeholder for the data item 142 to the local cache locker 162 in response to the user request. The user profile 160 may be dedicated to store data items, user information, such as name, address, identifier of the user 102b, identifier of the user device 120b, identifier of the user profile 160, etc. In some examples, the user profile 160 may include a digital wallet and/or a user profile associated with the user 102b.

Example Server

Server 170 generally includes a hardware computer system configured to facilitate the secured transfer of the data item 142 via the network 110. In certain embodiments, the server 170 may be implemented by a cluster of computing devices, such as virtual machines. For example, the server 170 may be implemented by a plurality of computing devices using distributed computing and/or cloud computing systems in a network. In certain embodiments, the server 170 may be configured to provide services and resources (e.g., update instructions, etc.) to other components and devices. The server 170 comprises a processor 172 operably coupled with a network interface 174 and a memory 176. The memory 176 stores software instructions 178 that when executed by the processor 172 cause the processor 172 to perform one or more operations of the server 170.

Processor 172 comprises one or more processors. The processor 172 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 172 may be a programmable logic device, a microcontroller, a microprocessor, or any suitable number and combination of the preceding. The one or more processors are configured to process data and may be implemented in hardware or software. For example, the processor 172 may be 8-bit, 16-bit, 32-bit, 64-bit, or of any other suitable architecture. The processor 172 may include an ALU for performing arithmetic and logic operations. The processor 172 may register the supply operands to the ALU and store the results of ALU operations. The processor 172 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 178) to perform the operations of the server 170 described herein. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-3. For example, the processor 172 may be configured to perform one or more operations of the operational flow 200 as described in FIG. 2 and one or more operations of the method 300 as described in FIG. 3.

Network interface 174 is configured to enable wired and/or wireless communications. The network interface 174 may be configured to communicate data between the server 170 and other devices, systems, or domains. For example, the network interface 174 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 172 may be configured to send and receive data using the network interface 174. The network interface 174 may be configured to use any suitable type of communication protocol.

The memory 176 may be a non-transitory computer-readable medium. The memory 176 may be volatile or non-volatile and may comprise ROM, RAM, TCAM, DRAM, and/or SRAM. The memory 176 may include one or more of a local database, a cloud database, a NAS, etc. The memory 176 comprises one or more disks, tape drives, or solid-state drives, and may be used as an over-flow data storage device, to store programs when such programs are selected for execution, and to store instructions and data that are read during program execution. The memory 176 may store any of the information described in FIGS. 1-3 along with any other data, instructions, logic, rules, or code operable to implement the function(s) described herein when executed by processor 172. For example, the memory 176 may store software instructions 178, auto-match maker module 186, smart contract generator module 180, smart contracts 182a and 182b, signal 188, and/or any other data or instructions. The software instructions 178 may comprise any suitable set of instructions, logic, rules, or code operable to execute the processor 172 and perform the functions described herein, such as some or all of those described in FIGS. 1-3.

The smart contract generator module 180 may be implemented by the processor 172 executing the software instructions 178 and is generally configured to generate smart contracts 182a and 182b based on operation data 138 and 166, respectively. For example, the user 102a, using the user device 120a, sends the operation data 138 to the server 170, indicating that they want to transfer or transmit the data item 142 with a set of conditions, such as the duration of the transfer, the duration of processing the data item 142, a rate of transfer, and other information used to generate the operation data 138. Similarly, the user 102b, using the user device 120b, sends the operation data 166 to the server 170, indicating that they want to receive the data item 142 with a set of conditions, such as duration of the receipt, a rate of transfer, and other information used to generate the operation data 166.

Each of the smart contracts 182*a-b* may be a self-executing contract where the terms of the agreement between the users 102*a-b* and conditional rules 184*a-b* are written into lines of code. In some embodiments, the smart contracts 182*a-b* may be run on a blockchain, which is a distributed and decentralized digital database. The code in each smart contract 182*a-b* may contain a set of conditional rules 184*a-b* that, when met, automatically executes the respective smart contract 182*a-b* and implement the terms, rules, and conditional rules 184*a-b*, respectively. In this manner, the smart contract 182*a-b* are used to achieve consensus about the status of the smart contracts 182*a-b* and trust between the users 102*a-b*.

The first smart contract 182*a* may include the conditional rules 184*a*. For example, the conditional rules 184*a* may include a rule that indicates the operation 136 is to be executed when a prospective user (e.g., second user 102*b*) who is requesting to receive the data item 142 and whose conditional rules 184*b* satisfy the conditional rules 184*a* is identified. In another example, the conditional rules 184*a* may include a verification rule to verify the authenticity and validity of the request of the prospective receiver of the data item 142 (e.g., user 102*b*), for example, by validating the credentials of the user 102*b*, the user profile 160 ID (e.g., digital wallet ID), and the like. In another example, conditional rules 184*a* may include a matching rule to match the user 102*a*'s request with a suitable receiver's request (e.g., user 102*b*) based on predefined criteria, such as the amount of data item 142, etc. In another example, the conditional rules 184*a* may include a rule that indicates the operation 136 is to be executed in response to determining that the operation data 138 and an operation data associated with a prospective receive of the data item 142 (e.g., operation data 166) are validated. In another example, the conditional rules 184*a* may include a reconciliation rule that indicates to proceed with the transfer of data item 142 when there is no error or warnings. In other examples, the conditional rules 184*a* may include other rules.

The smart contract 182*b* may include the conditional rules 184*b*. For example, the conditional rules 184*b* may include a rule that indicates the requested data item 142 is to be received when a corresponding data item 142 is available as indicated by a prospective smart contract of a prospective sender of the data item 142. In other examples, the conditional rule 184*b* may include counterpart rules of the conditional rules 184*a*. For example, the conditional rule 184*b* may include a validation rule to validate the sender of the data item 142, e.g., by validating their ID, user profile 130 ID (e.g., digital wallet ID), and the like. In another example, the conditional rules 184*b* may include a matching rule to match the user 102*b*'s request with a suitable sender's request (e.g., user 102*a*) based on predefined criteria, such as the amount of data item 142, etc. In another example, the conditional rules 184*b* may include a rule that indicates the data item 142 is to be received in response to determining that the operation data 138 and/or 166 is validated. In another example, the conditional rules 184*b* may include a reconciliation rule that indicates to proceed with the receipt of data item 142 when there is no error or warning. The conditional rules 184*b* may include other rules.

The auto-match maker module 186 may be implemented by the processor 172 executing the software instructions 178 and is generally configured to find a pair of users 102*a-b* whose associated conditional rules 184*a-b* would meet each other in order for the data item 142 to be transferred from the local cache locker 140 at the user device 120*a* to the local cache locker 162 at the user device 120*b*. For example, the auto-match maker module 186 may parse thought the smart contracts 182*a-b* and determine which smart contract 182*a-b* associated with a sender of the data item 142 satisfies the conditional rules 184*a-b* of which smart contract 182*a-b* associated with a receiver of the data item 142, and vice versa. In some embodiments, the auto-match maker module 186 may be implemented by code parsing, object-oriented programming, and/or a neural network machine learning algorithm to perform its functions. For example, the auto-match maker module 186 may compare the smart contract 182*a* with the smart contract 182*b* and determine whether the conditional rules 184*a* are met by the conditional rules 184*b*, and vice versa.

If the auto-match maker module 186 determines that the conditional rules 184*a* are met by the conditional rules 184*b*, and vice versa, the server 170 may facilitate the transfer of the data item 142 from the local cache locker 140 to the local cache locker 162. For example, the server 170 may communicate a signal 188 to the user device 120*a*, where the signal 188 indicates to transfer the data item 142 to the local cache locker 162.

Example Operational Flow for Performing Secured Operations

FIG. 2 illustrates an example operational flow 200 of system 100 of FIG. 1 for performing secured operations 136, including the transferring of data items 142 from a user device 120*a* to another user device 120*b*. In operation, the operational flow 200 may begin when the user 102*a* provides user input to the application 144, where the user input indicates a request to transfer a data item 142. In a particular embodiment where the data item 142 is cryptocurrency, the user input may be an indication that the user 102*a* wants to transfer a particular amount of cryptocurrency.

In current approaches, when a user wants to transfer or receive cryptocurrency, the user may share the cryptocurrency with a liquidity pool. The liquidity pool may be a shared online website where people can trade cryptocurrency. However, in current approaches, the user profiles 130, 160 of users can be traced using an ID associated with a data packet of the user that is sent to the liquidity pool. Therefore, a bad actor may access the content stored in the digital wallets of users by tracing back to the digital wallets using the IDs associated with the data packet of the users. The operational flow 200 of system 100 decouples the digital wallets of users from the liquidity pools.

Generating Operation Data

In the example operational flow 200, the user 102*a* provides the request that they want to transfer the data item 142, where the request may indicate information about the data item 142 and conditions that the user 102*a* wants to have implemented in order to transfer the data item 142. In response, the application 144 may place the data item 142 in the local cache locker 140. This may cause the data item 142 to be locked-meaning that it may not be used for other purposes other than transmitting. The user device 120*a* may access the data item 142 and generate the operation data 138 based on the data item 142, the user input (104*a* in FIG. 1), information associated with the user device 120*a*, information associated with the user 102*a*, among other data, similar to that described in FIG. 1. The user device 120*a* may feed the information listed above to the operation data generator module 134. The operation data generator module 134 may generate the operation data 138, similar to that described in FIG. 1.

In some embodiments, the operation data 138 may include information, data, rules, and conditions described in FIG. 1. In some embodiments, the operation data 138 may be immutable—meaning that the operation data 138 may not be changed. In response to generating the operation data 138, the user device 120*a* may communicate the operation data 138 to the server 170. The operation data 138 may indicate the authenticity and legitimacy of the user 102*a*.

The user 102*b* who wants to receive the data item 142 may provide user input to the application 168 to indicate that they want to receive the data item 142. In response, the user device 120*b*, e.g., via the application 168 may add the request of the user 102*b* to the local cache locker 162. For example, the user device 120*b* may add a placeholder for the data item 142 in the local cache locker 162. In response, the local cache locker 162 may be locked-meaning that the content of the local cache locker 162 cannot be changed.

The user device 120*b* may generate the operation data 166 based on the user 102*b*'s request, information associated with the user device 120*b*, information associated with the user 102*b*, among other data, similar to that described in FIG. 1. In this process, the user device 120*b* may feed the information listed above to the operation data generator module 164 and the operation data generator module 164 may generate the operation data 166, similar to that described in FIG. 1. In some embodiments, the operation data 166 may include information, data, rules, and conditions described in FIG. 1. In some embodiments, the operation data 166 may be immutable. In response to generating the operation data 166, the user device 120*b* may communicate the operation data 166 to the server 170. The operation data 166 may indicate the authenticity and legitimacy of the user 102*b*.

Validating Conditional Rules in Order to Transfer the Data Item

The server 170 receives the operation data 138 and 166 from the user device 120*a* and 120*b*, respectively. The server 170 may analyze each operation data 138 and 166 to determine the content of each operation data 138 and 166. The server 170 may generate the smart contracts 182*a-b* based on the operation data 138 and 166, similar to that described in FIG. 1. For example, the server 170 may feed the operation data 138 to the smart contract generator module 180 and the smart contract generator module 180 may generate the smart contract 182*a* based on the operation data 138. The smart contract 182*a* may include the set of conditional rules 184*a* that may include rules set by user 102*a* among other rules/data, similar to that described in FIG. 1. Similarly, the server 170 may feed the operation data 166 to the smart contract generator module 180 and the smart contract generator module 180 may generate the smart contract 182*b* based on the operation data 166. The smart contract 182*b* may include the set of conditional rules 184*b* that may include rules set by the user 102*b* among other rules/data, similar to that described in FIG. 1.

In response to generating the smart contracts 182*a-b*, the server 170, e.g., via the auto-match maker module 186 may determine whether the smart contract 182*a* satisfies the conditional rules 184*b* of the smart contract 182*b*, and vice versa. Although, only two smart contracts 182*a-b* are illustrated and discussed in the example of FIGS. 1 and 2, there may be many users 102 indicating their request to transfer or receive different types and kinds of data items 132, 142 on their user devices 120, multiple operation data may be generated and sent to the server 170, and multiple smart contracts 182 may be available in the server 170. Therefore, in this process, the auto-match maker module 186 may parse through multiple smart contracts 182*a-b* to determine or find a matching sender and receiver of data items.

In the example of FIG. 2, the server 170 may determine that the conditional rules 184*a* of the smart contract 182*a* are met by the smart contract 182*b*. Similarly, the server 170 may determine that the conditional rules 184*b* of the smart contract 182*b* are met by the smart contract 182*a*. In response to determining that the conditional rule 184*a* and 184*b* are met by each other, the server 170 may facilitate the execution of the operation 136, which in the example of FIG. 2, is transmitting the data item 142 from the local cache locker 140 to the local cache locker 162.

To this end, the server 170 may communicate a signal 188 to the user device 120*a*, where the signal 188 indicates (and/or causes the user device 120*a*) to transfer the data item 142 from the local cache locker 140 to the local cache locker 162. For example, the signal 188 may cause the user device 120*a* to transfer the data item 142 from the user device 120*a* to the user device 120*b* via network 110. In response to receiving the signal 188, the user device 120*a* may transfer the item 142 to the user device 120*b*. The user device 120*b* may store the data item 142 in the local cache locker 162.

Example Method for Performing a Secured Operation

FIG. 3 illustrates an example flowchart of a method 300 for preforming a secured operation 136, according to some embodiments. Modifications, additions, or omissions may be made to method 300. Method 300 may include more, fewer, or other operations. For example, operations may be performed in parallel or in any suitable order. While at times it is discussed that the system 100, user devices 120*a,b*, server 170, or components of any of thereof perform some operations, any suitable system or components of the system may perform one or more operations of the method 300. For example, one or more operations of method 300 may be implemented, at least in part, in the form of software instructions 128, 158, 178 of FIG. 1, stored on a tangible non-transitory machine-readable medium (e.g., memory 126, 156, 176 of FIG. 1) that when run by one or more processors (e.g., processor 122, 152, 172 of FIG. 1) may cause the one or more processors to perform operations 302-312.

At operation 302, the server 170 receives a first operation data 138 from the first user device 120*a*, where the first operation data 138 is associated with the transfer of a data item 142. For example, prior to operation 302, the user device 120*a* may generate the operation data 138, similar to that described in FIGS. 1 and 2.

At operation 304, the server 170 receives a second operation data 166 from the second user device 120*b*, where the second operation data 166 is associated with the receipt of the data item 142. For example, prior to operation 304, the user device 120*b* may generate the operation data 166, similar to that described in FIGS. 1 and 2.

At operation 306, the server 170 generates a first smart contract 182*a* based on the first operation data 138, where the first smart contract 182*a* includes a first set of conditional rules 184*a*, similar to that described in FIGS. 1 and 2.

At operation 308, the server 170 generates a second smart contract 182*b* based on the second operation data 166, where the second smart contract 182*b* includes a second set of conditional rules 184*b*, similar to that described in FIGS. 1 and 2.

At operation 310, the server 170 determines whether the first set of conditional rules 184*a* satisfies the second set of conditional rules 184*b*, and vice versa. If it is determined that the first set of conditional rules 184*a* satisfies the second set of conditional rules 184*b*, and vice versa, the method 300 proceeds to operation 312. Otherwise, the method 300 is terminated.

At operation 312, the server 170 communicates, to the first user device 120*a*, a signal 188 that indicates to transfer the data item 142 to the second user device 120*b*. In response, the data item 142 is transferred or transmitted from the local cache locker 140 to the local cache locker 162, similar to that described in FIGS. 1 and 2. In other words, the data item 142 may be transmitted to the local cache locker 162 in conjunction with receipt of the signal 188.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for performing a secured operation, comprising:
    a first user device comprising:
        a first memory configured to store an operation, wherein the operation comprises transferring a data item from a first user profile associated with a first user; and
        a first processor operably coupled to the first memory, and configured to:
            receive user input indicating the data item;
            in response to receiving the user input, move the data item into a first local cache locker within the first memory, wherein:
            the first local cache locker is configured to be locked when the data item is transferred into the first cache locker, causing the data item to not be used for purposes other than transmitting; and
            the first local cache locker is outside the first user profile;
            generate first operation data associated with the operation, wherein:
            the first operation data comprises one or more of an origin of the operation, the data item, or a unique identifier identifying the first user; and
            the first operation data is generated based at least in part upon the user input; and
            communicate the first operation data; and
    a server communicatively coupled to the first user device, and comprising:

a second processor configured to:
        receive the first operation data from the first user device;
        generate, based at least in part upon the first operation data, one or more first conditional rules that comprise a first rule that indicates that the operation is to be executed when a second user requesting to receive the data item is identified;
        receive second operation data associated with the requested data item from a second user device of the second user;
        generate, based at least in part upon the second operation data, one or more second conditional rules;
        determine whether the one or more first conditional rules and the one or more second conditional rules are met; and
        in response to determining that the one or more first conditional rules are met and the one or more second conditional rules are met, communicate a signal to the first user device, where the signal indicates to transfer the data item from the first local cache locker to a second local cache locker within a second memory of the second user device wherein:
            the second local cache locker is configured to be locked when the data item is transferred into the second local cache locker;
            when the second local cache locker is locked, content of the second local cache locker is not changed; and
            the second local cache locker is outside of a second user profile of the second user within the second memory;
    wherein the first processor is further configured to transfer the data item to the second local cache locker only in response to receiving the signal.

2. The system of claim 1, wherein the second operation data comprises one or more of an origin of the second operation data, a unique identifier identifying the second user, or the requested data item; and wherein the one or more second conditional rules comprise a third rule that indicates the requested data item is to be received when a corresponding data item is available.

3. The system of claim 1, further comprising: the second user device is communicatively coupled to the first user device and the server, and comprises a third processor configured to:
    receive a second user input indicating the requested data item;
    generate the second operation data associated with the requested data item, wherein the second operation data comprises one or more of an origin of the second operation data, a unique identifier identifying the second user, or the requested data item; and
    communicate the second operation data to the server.

4. The system of claim 1, wherein the first operation data further comprises one or more of a duration of the operation or a timestamp of originating the operation.

5. The system of claim 1, wherein the one or more first conditional rules further comprise a second rule that indicates that the operation is to be executed in response to determining that the first operation data is validated.

6. The system of claim 1, wherein the first operation data is immutable.

7. A method for performing a secured operation, comprising:

storing, by a first user device, an operation, wherein the operation comprises transferring a data item from a first user profile associated with a first user;

receiving, by the first user device, user input indicating the data item;

in response to receiving the user input, moving, by the first user device, the data item into a first local cache locker within the first memory, wherein:

the first local cache locker is configured to be locked when the data item is transferred into the first cache locker, causing the data item to not be used for purposes other than transmitting; and the first local cache locker is outside the first user profile;

generating, by the first user device, first operation data associated with the operation, wherein:

the first operation data comprises one or more of an origin of the operation, the data item, or a unique identifier identifying the first user; and the first operation data is generated based at least in part upon the user input;

communicating, by the first user device, the first operation data;

receiving, by a server, the first operation data from the first user device;

generating, by the server, based at least in part upon the first operation data, one or more first conditional rules that comprises a first rule that indicates that the operation is to be executed when a second user requesting to receive the data item is identified;

receiving, by the server, second operation data associated with the requested data item from a second user device of the second user;

generating, by the server, based at least in part upon the second operation data, one or more second conditional rules;

determining, by the server, whether the one or more first conditional rules and the one or more second conditional rules are met;

in response to determining that the one or more first conditional rules are met and the one or more second conditional rules are met, communicating, by the server, a signal to the first user device, where the signal indicates to transfer the data item from the first local cache locker to a second local cache locker within a second memory of the second user device, wherein:

the second local cache locker is configured to be locked when the data item is transferred into the second local cache locker;

when the second local cache locker is locked, content of the second local cache locker is not changed; and the second local cache locker is outside of a second user profile of the second user within the second memory; and transferring, by the first user device, the data item to the second local cache locker only in response to receiving the signal.

8. The method of claim 7, wherein the second operation data comprises one or more of an origin of the second operation data, a unique identifier identifying the second user, or the requested data item; and wherein the one or more second conditional rules that comprise a third rule that indicates the requested data item is to be received when a corresponding data item is available.

9. The method of claim 7, further comprising:

receiving, by the second user device, a second user input indicating the requested data item;

generating, by the second user device, the second operation data associated with the requested data item, wherein the second operation data comprises one or more of an origin of the second operation data, a unique identifier identifying the second user, or the requested data item; and communicating, by the second user device, the second operation data to the server.

10. The method of claim 7, wherein the first operation data further comprises one or more of a duration of the operation or a timestamp of originating the operation.

11. The method of claim 7, wherein the one or more first conditional rules further comprise a second rule that indicates that the operation is to be executed in response to determining that the first operation data is validated.

12. The method of claim 7, wherein the first operation data is immutable.

13. A non-transitory computer-readable medium storing instructions that when executed by a processor, cause the processor to:

receive first operation data from a first user device, wherein:

the first operation first data correspond to an operation that comprises transferring a data item from a first user profile associated with a first user;

the first operation data comprises one or more of an origin of the operation, the data item, or a unique identifier identifying the first user;

the first operation data is generated based at least in part upon a user input received at the first user device and indicating the data item;

in response to receiving the user input, the first user device moves the data item into a first local cache locker within a first memory of the first user device;

the first local cache locker is configured to be locked when the data item is transferred into the first cache locker, causing the data item to not be used for purposes other than transmitting; and the first local cache locker is outside the first user profile;

generate, based at least in part upon the first operation data, one or more first conditional rules that comprises a first rule that indicates that the operation is to be executed when a second user requesting to receive the data item is identified;

receive second operation data associated with the requested data item from a second user device of the second user;

generate, based at least in part upon the second operation data, one or more second conditional rules that comprise a second rule that indicates the requested data item is to be received when a corresponding data item is available;

determine whether the one or more first conditional rules are met by the one or more second conditional rules;

determine whether the one or more second conditional rules are met by the one or more first conditional rules; and in response to determining that the one or more first conditional rules are met by the one or more second conditional rules and that the one or more second conditional rules are met by the one or more first conditional rules, communicate a signal to the first user device, where the signal indicates to transfer the data item from the first local cache locker to a second local cache locker within a second memory of the second user device, wherein:

the second local cache locker is configured to be locked when the data item is transferred into the second local cache locker;

when the second local cache locker is locked, content of the second local cache locker is not changed;

the second local cache locker is outside of a second user profile of the second user within the second memory; and the first user device is configured to transfer the data item to the second local cache locker only in response to receiving the signal.

14. The non-transitory computer-readable medium of claim 13, wherein the first operation data further comprises one or more of a duration of the operation or a timestamp of originating the operation.

15. The non-transitory computer-readable medium of claim 13, wherein the one or more first conditional rules further comprise a second rule that indicates that the operation is to be executed in response to determining that the first operation data is validated.

16. The non-transitory computer-readable medium of claim 13, wherein:

the first operation data is immutable; and the second operation data is immutable.

17. The non-transitory computer-readable medium of claim 13, wherein the second operation data comprises one or more of an origin of the second operation data, a unique identifier identifying a second user, or the requested data item.

18. The non-transitory computer-readable medium of claim 13, wherein the data item is transmitted to the second user profile in conjunction with the signal.

* * * * *